(12) United States Patent
Andersen et al.

(10) Patent No.: US 10,344,179 B2
(45) Date of Patent: Jul. 9, 2019

(54) ADHESION PROMOTER FOR SOLVENTBORNE CLEARCOAT MATERIALS

(71) Applicant: BASF COATINGS GmbH, Muenster (DE)

(72) Inventors: Audree Andersen, Havixbeck (DE); Cathrin Corten, Unna (DE); Fatmir Raka, Muenster (DE); Manuela Niemeier, Drensteinfurt (DE); Nicole Freitag, Muenster (DE); Stefanie Boshe-Plois, Ochtrup (DE); Andreas Feigl, Drensteinfurt (DE); Christian Weiher, Muenster (DE)

(73) Assignee: BASF COATINGS GmbH, Muenster (DE)

( * ) Notice: Subject to any disclaimer, the term of this patent is extended or adjusted under 35 U.S.C. 154(b) by 419 days.

(21) Appl. No.: 15/104,615

(22) PCT Filed: Dec. 17, 2014

(86) PCT No.: PCT/EP2014/078249
§ 371 (c)(1),
(2) Date: Jun. 15, 2016

(87) PCT Pub. No.: WO2015/091663
PCT Pub. Date: Jun. 25, 2015

(65) Prior Publication Data
US 2016/0312057 A1    Oct. 27, 2016

(30) Foreign Application Priority Data
Dec. 17, 2013 (EP) .................................... 13197704

(51) Int. Cl.
| | | |
|---|---|---|
| C09D 167/00 | (2006.01) |
| C08G 18/68 | (2006.01) |
| C08G 18/71 | (2006.01) |
| C08G 63/52 | (2006.01) |
| C08G 63/91 | (2006.01) |
| B05D 7/00 | (2006.01) |
| C09D 5/00 | (2006.01) |
| C09D 7/63 | (2018.01) |
| C08K 5/5419 | (2006.01) |

(52) U.S. Cl.
CPC ........... *C09D 167/00* (2013.01); *B05D 7/532* (2013.01); *C08G 18/68* (2013.01); *C08G 18/718* (2013.01); *C08G 63/52* (2013.01); *C08G 63/918* (2013.01); *C09D 5/002* (2013.01); *C09D 7/63* (2018.01); *C08K 5/5419* (2013.01)

(58) Field of Classification Search
CPC ............................. C09D 167/00; C08G 18/68
See application file for complete search history.

(56) References Cited

U.S. PATENT DOCUMENTS

| | | | | |
|---|---|---|---|---|
| 2008/0293908 A1* | 11/2008 | Ludewig | ................ | C08G 18/10 528/26 |
| 2011/0130512 A1 | 6/2011 | Ludewig et al. | | |
| 2012/0045632 A1* | 2/2012 | Low | .................. | B32B 17/10036 428/216 |

FOREIGN PATENT DOCUMENTS

| | | |
|---|---|---|
| EP | 1 995 261 A1 | 11/2008 |
| WO | 2012/058735 A1 | 5/2012 |

OTHER PUBLICATIONS

International Search Report dated Mar. 19, 2015 in PCT/EP2014/078249 Filed Dec. 17, 2014.

* cited by examiner

*Primary Examiner* — Wenwen Cai
(74) *Attorney, Agent, or Firm* — Oblon, McClelland, Maier & Neustadt, L.L.P.

(57) ABSTRACT

The present invention relates to a solventborne clearcoat material which comprises at least one additive preparable by reacting at least one alpha,omega-hydroxy-functionalized oligoester which has an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10 000 g/mol, and at least one alkoxysilane which possesses an OH-reactive functional group, the sum of the weight percentage fractions of all additives of the invention being 0.5 to 10 wt %, based on the total amount of the solventborne clearcoat material. The present invention further relates to a process for producing multicoat paint systems, and to multicoat paint systems producible by means of said process. The invention further relates to the use of the above-identified additive in solventborne clearcoat materials for the purpose of improving adhesion.

15 Claims, No Drawings

ADHESION PROMOTER FOR SOLVENTBORNE CLEARCOAT MATERIALS

The invention relates to a solventborne clearcoat material. It further relates to a method for producing a multicoat paint system on a substrate, and to corresponding multicoat paint systems on a substrate. The present invention relates, lastly, to the use of such additives for improving adhesion in a solventborne clearcoat material.

PRIOR ART

In a typical multicoat paint system in automotive OEM finishing, a substrate coated with an electrodeposition coating system is coated further with a primer surface coat, a basecoat, and a clearcoat. Clearcoat materials used may be 2-component (2K) clearcoat materials, for example. A clearcoat is a coating material which, after application and curing, forms a transparent coating (the clearcoat) having protective and/or decorative properties. Protective properties are, for example, scratch resistance and weathering resistance, especially UV resistance. A decorative property is, for example, good gloss. In automotive OEM finishing there may be overbaking of the resultant multicoat paint system. The term "overbaking" refers to the damage to the surface of the finish as a result of local overheating. Overbaking results in a deterioration, in particular, in the adhesion properties of the resultant clearcoat surface, which affects, for example, refinishing or window bonding.

OBJECTIVE

The problem addressed by the present invention was therefore that of improving the adhesion properties of an overbaked clearcoat. An improvement in the adhesion properties is to be obtained more particularly for refinishing or for window bonding, but also for the adhesion of various further components, such as, for example, adhesive acrylate tape for the mounting of trim strips or model badges. At the same time, moreover, the base formula of a conventional clearcoat system is to be modified as little as possible. Furthermore, the protective and decorative properties of the clearcoat are not to be impaired as a result.

SOLUTION ACCORDING TO THE INVENTION

This problem has surprisingly been solved by a solventborne clearcoat material whose distinctive feature is that it comprises at least one additive which is preparable by reacting
(a) at least one alpha,omega-hydroxy-functionalized oligoester which possesses an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10 000 g/mol, and
(b) at least one alkoxysilane of the structural formula (II)

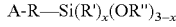

A-R—Si(R')$_x$(OR")$_{3-x}$ where
A is an OH-reactive functional group,
R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms,
the radical R' is selected from the group of C1 to C12 alkyl radicals, R" is a methyl or ethyl radical, and
x is 0 to 2,
with the proviso that at least 90 mol % of all the OH groups of the alpha,omega-hydroxy-functionalized oligoester have been reacted with an OH-reactive functional group A, and, in addition, the sum of the weight percentage fractions of all additives of the invention is 0.5 to 10 wt %, based on the total amount of the solventborne clearcoat material.

Description of the Alpha,Omega-Hydroxy-Functionalized Oligoester

The term alpha, omega-hydroxy-functionalized oligoester identifies an oligoester on each of whose opposite ends, identified by alpha and omega respectively, there is a hydroxyl group. This means that at both ends an oligoester of this kind is terminated by a monomer unit carrying in each case precisely one hydroxyl group. Where the oligoester is branched, alpha and omega refer to the ends of the longest polymer chain in the monomer. This length is defined by the number of monomers incorporated. Nor is it impossible for the alpha,omega-hydroxy-functionalized oligoester to possess further hydroxyl groups. It is preferred for the alpha, omega-hydroxy-functionalized oligoester for use in accordance with the invention to possess precisely two hydroxyl groups, one in alpha and one in omega position. It is particularly preferred for the alpha,omega-hydroxy-functionalized oligoester for use in accordance with the invention to possess precisely two hydroxyl groups, one in alpha and one in omega position, and also to be linear.

The alpha,omega-hydroxy-functionalized oligoester for use in accordance with the invention possesses an OH number of preferably 40 to 160 mg KOH/g and more preferably of 70 to 150 mg KOH/g. The OH number may be determined in accordance with DIN 53240-2 (date: November 2007) as follows. The OH groups are reacted by acetylation with an excess of acetic anhydride. The excess acetic anhydride is subsequently cleaved by addition of water to form acetic acid, and the entire acetic acid is back-titrated with ethanolic KOH. The OH number indicates the amount of KOH in mg which is equivalent to the amount of acetic acid bound in the acetylation of 1 g of substance.

The alpha,omega-hydroxy-functionalized oligoester for use in accordance with the invention further possesses an acid number of preferably 0 to 10 mg KOH/g, more preferably 0 to 5 mg KOH/g, and very preferably 0 to 3 mg KOH/g. The acid number is determined in accordance with DIN EN ISO 2114 (date: June 2002). In this determination, the free acids present in the sample are titrated with a standard potassium hydroxide solution in the presence of a color indicator. The acid number corresponds to the mass of potassium hydroxide in mg which is needed to neutralize 1 g of alpha,omega-hydroxy-functionalized oligoester under specified conditions.

The alpha,omega-hydroxy-functionalized oligoester further possesses a preferred number-average molecular weight of 1000 to 2000 g/mol and more preferably of 1200 to 1800 g/mol and also a weight-average molecular weight of preferably 3000 to 8000 g/mol and more preferably 3000 to 6000 g/mol. The number-average and weight-average molecular weights are determined by gel permeation chromatography with tetrahydrofuran as eluent, using polystyrene standards, in accordance with DIN 55672-1 (date: August 2007). The column material consists of styrene-divinylbenzene copolymers.

It is essential to the invention that the alpha,omega-hydroxy-functionalized oligoester possesses a theoretical carbon-carbon double bond content of 1 to 2.5 mmol/g, preferably of 1.5 to 2 mmol/g, and more preferably of 1.6 to 1.9 mmol/g. The theoretical carbon-carbon double bond content refers to the amount of substance of the carbon-carbon double bonds, in the unit mmol, based on the mass of the alpha,omega-hydroxy-functionalized oligoester, in the unit gram. The theoretical carbon-carbon double bond content, referred to as double bond content in the formula depicted below, is calculated as follows:

$$\text{Double bond content} = \frac{\text{Amount of substance(double bonds)}}{\text{Mass(oligoester)}}$$

Here, the expression "amount of substance(double bonds)" refers to the amount of substance of the carbon-carbon double bonds, in the unit mmol, and the expression "mass(oligoester)" refers to the mass of the alpha,omega-hydroxy-functionalized oligoester in the unit gram.

The mass of the alpha,omega-hydroxy-functionalized oligoester is the sum of the monomers used in its preparation, minus the mass of the water formed therein, on the assumption of complete conversion of all anhydride groups and carboxylic acid groups. The amount of substance of the carbon-carbon double bonds is given by the amount of substance of the unsaturated monomers employed. Where, for example, exclusively monounsaturated monomers are employed, such as maleic anhydride, for example, the amount of substance of the carbon-carbon double bonds is equal to the amount of substance of the unsaturated monomers employed. Where, for example, diunsaturated monomers are employed, the amount of substance of the carbon-carbon double bonds introduced by such monomers into the alpha,omega-hydroxy-functionalized oligoester is twice as large as the amount of substance of the corresponding diunsaturated monomer employed.

The alpha,omega-hydroxy-functionalized oligoester may be prepared, for example, from the reaction of polycarboxylic acids with polyols. It is preferably prepared from reaction of dicarboxylic acids and also their anhydrides and diols, triols, and monohydroxy-functional compounds. Diols are used with preference.

Where the alpha,omega-hydroxy-functionalized oligoester is prepared with dicarboxylic acids, it is in principle also possible to use their anhydrides. In the text below, therefore, the term dicarboxylic acid should be interpreted to likewise include the corresponding anhydride. Deciding to use the compounds in question either as dicarboxylic acid or as anhydride is part of the general knowledge of a person of ordinary skill in the art.

Dicarboxylic Acids

The dicarboxylic acids for use in accordance with the invention may be aromatic or aliphatic compounds. Aliphatic compounds are compounds which do not contain any aromatic groups, such as a benzene radical, for example. An aromatic compound for the purposes of the present invention is any compound comprising at least one aromatic group, such as a benzene radical, for example. Examples of an aromatic compound include, for example, the constitutional isomers of benzenedicarboxylic acid, which are known to the skilled person, and also terephthalic anhydride.

Aliphatic dicarboxylic acids are preferred. With particular preference, the aliphatic dicarboxylic acids are saturated or mono- or polyunsaturated. Especially preferred are linear aliphatic dicarboxylic acids, which are either saturated or mono- or polyunsaturated. Besides these, it is also possible to use cycloaliphatic dicarboxylic acids.

It is preferred, moreover, for at least one saturated and at least one mono- or polyunsaturated aliphatic dicarboxylic acid to be used.

Particular preference is given to using at least one saturated linear aliphatic dicarboxylic acid and at least one mono- or polyunsaturated linear aliphatic dicarboxylic acid. Particular preference is given to using precisely one saturated and precisely one mono- or polyunsaturated aliphatic dicarboxylic acid. Very particular preference is given to using precisely one saturated linear and precisely one mono- or polyunsaturated linear aliphatic dicarboxylic acid.

The molar ratio of saturated to mono- and/or polyunsaturated aliphatic dicarboxylic acids is preferably 0.5:1.5 to 1.5:0.5, particularly preferably 0.75:1.25 to 1.25:0.75 and very preferably 0.9:1.1 to 1.1:0.9. The stated ratios relate to cases both where more than one saturated and/or more than one unsaturated dicarboxylic acid are used, and where precisely one saturated and precisely one unsaturated dicarboxylic acid are used.

Saturated aliphatic dicarboxylic acids used are preferably those having 4 to 18, more preferably 6 to 14, and very preferably 6 to 10 carbon atoms. With particular preference these are linear saturated aliphatic dicarboxylic acids.

Monounsaturated aliphatic dicarboxylic acids used are preferably those having 4 to 10, more preferably 4 to 8, and very preferably 4 to 6 carbon atoms. With particular preference these are corresponding unsaturated linear aliphatic dicarboxylic acids. Polyunsaturated aliphatic dicarboxylic acids used are preferably those having 6 to 18, more preferably 8 to 16, and very preferably 10 to 14 carbon atoms. With particular preference these are corresponding polyunsaturated linear aliphatic dicarboxylic acids.

The saturated aliphatic dicarboxylic acids are, for example, alkanedioic acids. Preference is given to using saturated alkanedioic acids which contain 4 to 18, more preferably 6 to 14, and very preferably 6 to 10 carbon atoms. With particular preference these are saturated linear alkanedioic acids which contain 4 to 18, more preferably 6 to 14, and very preferably 6 to 10 carbon atoms. Suitable alkanedioic acids are, for example, succinic acid, glutaric acid, adipic acid, pimelic acid, suberic acid, azelaic acid, sebacic acid, undecanedioic acid, dodecanedioic acid, tridecanedioic acid, tetradecanedioic acid, and hexadecanedioic acid, and also their anhydrides, where the latter exist.

Monounsaturated aliphatic dicarboxylic acids which can be used are alkenedioic acids which contain 4 to 10, more preferably 4 to 8, and very preferably 4 to 6 carbon atoms. Preferably these are corresponding monounsaturated linear alkenedioic acids. An example of a suitable monounsaturated linear alkenedioic acid is maleic acid.

Diols

The diols for preferred use may be aromatic or aliphatic compounds. Aliphatic diols are preferred. With particular preference they are linear or cyclic aliphatic diols. These diols may be either saturated or mono- or polyunsaturated. Preferably they are saturated linear or saturated cyclic aliphatic diols.

For example it is possible to use saturated aliphatic diols having 4 to 18, more preferably 6 to 14, and very preferably 6 to 10 carbon atoms. Preferably these are corresponding saturated linear or saturated cyclic aliphatic diols.

Preference is given to using saturated alkanediols or saturated cycloalkanediols. The latter diols may be monocycloalkanediols, bicycloalkanediols, or tricyclo-alkanediols. For example it is possible to use saturated alkanediols having 4 to 18, more preferably 6 to 14, and very preferably 6 to 10 carbon atoms. Preferably these are corresponding saturated linear alkanediols. Suitable saturated alkanediols are, for example, 1,4-butanediol and 1,6-hexanediol.

It is also possible with preference to use saturated cyclic aliphatic diols having 6 to 18, more preferably 6 to 14, and very preferably 6 to 10 carbon atoms.

It is possible with preference to use saturated cycloalkanediols having 6 to 18, more preferably 6 to 14, and very preferably 6 to 10 carbon atoms. Saturated cycloalkane diols for very preferred use are tricyclo-decanediol, cyclohexyldimethanol, and tetramethylcyclo-butanediol.

The alpha,omega-hydroxy-functionalized oligoester is prepared using an excess of diols. The molar ratio of dicarboxylic acids to the diols is then, for example, n:(n+1.1) to n:(n+2), preferably n:(n+1.2) to n:(n+1.8), more preferably n:(n+1.3) to n:(n+1.6) and very preferably n:(n+1.3) to n:(n+1.5), where n denotes the amount of substance of the dicarboxylic acid.

The alpha,omega-hydroxy-functionalized oligoester is prepared in a manner familiar to the skilled person. In order to obtain quantitative conversion of the reactants used, the water formed during the reaction must be removed from the chemical equilibrium. This occurs primarily through the use of a water separator. The alpha,omega-hydroxy-functionalized oligoester, accordingly, is a polycondensation product. The alpha,omega-hydroxy-functionalized oligoester therefore constitutes a mixture of corresponding oligoesters with different chain lengths.

In one preferred embodiment of the alpha,omega-hydroxy-functionalized oligoester for use in accordance with the invention, it is prepared using at least one saturated linear aliphatic dicarboxylic acid, at least one monounsaturated linear aliphatic dicarboxylic acid, and at least one saturated aliphatic diol. The saturated linear aliphatic dicarboxylic acid for use is preferably a linear alkanedioic acid having 4 to 18, more preferably 6 to 14, and very preferably 6 to 10 carbon atoms. The monounsaturated linear dicarboxylic acid is preferably a monounsaturated linear alkenedioic acid having 4 to 10, more preferably 4 to 8, and very preferably 4 to 6 carbon atoms. The saturated aliphatic diol preferably comprises saturated linear alkanediols having 4 to 18, more preferably 6 to 14, and very preferably 6 to 10 carbon atoms, or, likewise preferably, comprises saturated cycloalkanediols having 6 to 18, more preferably 6 to 14, and very preferably 6 to 10 carbon atoms.

Furthermore, of course, it is also possible when preparing the alpha,omega-hydroxy-functionalized oligoester to use triols and monohydroxy-functional compounds. For example, aliphatic triols and also aliphatic monohydroxy-functional compounds may be used. These are preferably corresponding aliphatic hydrocarbon compounds. An example that may be given of a triol is trimethylolpropane. As monohydroxy-functional compounds, for example, dodecanol may be used.

In a further preferred embodiment, the alpha,omega-hydroxy-functionalized oligoester possesses the following structural formula (I):

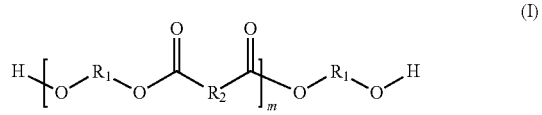

(I)

where
the radicals $R_1$ independently of one another are selected from the group of linear or cyclic alkylene radicals, the radicals R2 independently of one another are selected from the group of alkylene or alkenylene radicals, the ratio of alkylene to alkenylene radicals being selected specifically such that the alpha,omega-hydroxy-functionalized oligoester of the structural formula (I) possesses a theoretical carbon-carbon double bond content of 1 to 2.5 mmol/g, and the index m is selected such that the number-average molecular weight of the alpha,omega-hydroxy-functionalized oligoester of the structural formula (I) is 1000 to 3000 g/mol.

The index m in the structural formula (I) is an integer which is greater than zero.

The requirement that the index m be selected such that the number-average molecular weight of the alpha,omega-hydroxy-functionalized oligoester of the structural formula (I) is 1000 to 3000 g/mol will be explained below. It is to be assumed that all (m+1) radicals $R_1$ are a hexamethylene radical, and that half of all m radicals $R_2$ are each a tetramethylene radical and the other half are each a radical of the formula —CH=CH—. If, for example, the number-average molecular weight is 1500 g/mol, then m is on average between 6 and 7.

The number-average molecular weight of the alpha,omega-hydroxy-functionalized oligoester of the structural formula (I) is preferably 1000 to 2000 g/mol and more preferably 1200 to 1800 g/mol.

The weight-average molecular weight of the alpha,omega-hydroxy-functionalized oligoester of the structural formula (I) is preferably 3000 to 8000 g/mol and more preferably 3000 to 6000 g/mol.

The alpha,omega-hydroxy-functionalized oligoester of the structural formula (I) possesses an OH number of preferably 40 to 160 mg KOH/g and more preferably 70 to 150 mg KOH/g.

The alpha,omega-hydroxy-functionalized oligoester of the structural formula (I) preferably possesses a theoretical carbon-carbon double bond content of 1.5 to 2 mmol/g, and more preferably of 1.6 to 1.9 mmol/g.

The alpha,omega-hydroxy-functionalized oligoester of the structural formula (I) possesses an acid number of preferably 0 to 10 mg KOH/g, more preferably 0 to 5 mg KOH/g, and very preferably 0 to 3 mg KOH/g. Theoretically, the acid number of the alpha,omega-hydroxy-functionalized oligoester of the structural formula (I) is 0 mg KOH/g. If said oligoester is prepared from corresponding diols and also corresponding dicarboxylic acids and/or their anhydrides, then it is possible in principle for carboxylic acid groups to be present which have not reacted with a corresponding diol. In such a case, the resulting product mixture would have an acid number of >0 mg KOH/g. In accordance with the ranges stated above for the acid number, it is preferred for the resulting reaction mixture to possess as few carboxylic acid groups as possible.

Independently of one another, the radicals $R^1$ are selected from the group of linear or cyclic alkylene radicals. If there is more than one kind of radicals $R_1$ present in the alpha,omega-hydroxy-functionalized oligoester of the structural formula (I), their arrangement is statistical. In the case of a linear alkylene radical, it contains preferably 4 to 18, more preferably 6 to 14, and very preferably 6 to 10 carbon atoms. With very particular preference this is a hexamethylene radical. In the case of a cyclic alkylene radical, it contains preferably 6 to 18, more preferably 6 to 14, and very preferably 6 to 10 carbon atoms. With very particular preference this is a tricyclodecane radical.

Independently of one another, the radicals $R_2$ are selected from the group of alkylene or alkenylene radicals, the ratio of alkylene to alkenylene radicals being specifically selected such that the alpha,omega-hydroxy-functionalized oligoester of the structural formula (I) possesses a theoretical carbon-carbon double bond content of 1 to 2.5 mmol/g, preferably of 1.5 to 2 mmol/g, and very preferably of 1.6 to 1.9 mmol/g. The arrangement of the different kinds of radicals $R_2$ in the alpha, omega-hydroxy-functionalized oligoester of the structural formula (I) is statistical.

$R_2$ is preferably either a linear alkylene radical or a linear alkenylene radical. It is likewise preferred for the molar ratio between the alkylene and alkenylene radicals to be 0.5:1.5 to 1.5:0.5, particularly preferably 0.75:1.25 to 1.25:0.75, and very preferably 0.9:1.1 to 1.1:0.9.

If $R_2$ is a linear alkylene radical, it contains preferably 2 to 16, more preferably 4 to 12, and very preferably 4 to 8 carbon atoms. It is, for example, a tetramethylene radical.

$R_2$ may, furthermore, be a linear alkenylene radical. This radical is preferably a monounsaturated linear alkenylene radical which contains preferably 2 to 8, more preferably 2 to 6, and very preferably 2 to 4 carbon atoms. With very particular preference it is an alkenylene radical of the structure —CH=CH—.

Description of the Alkoxysilane of the Structural Formula (II)

An aliphatic radical R is an organic radical which possesses no aromatic groups such as a phenyl radical, for example. The aliphatic radical R may have 2 to 12 carbon atoms. A cycloaliphatic radical R is an organic radical which possesses no aromatic groups such as a phenyl radical, for example. The cycloaliphatic radical R may have 3 to 12 carbon atoms, as in the case of cyclopropyl or cyclohexyl, for example. An aromatic radical R is an organic radical which is constructed from aromatic groups, such as a phenylene radical, for example. The aromatic radical R may have 6 to 12 carbon atoms. An araliphatic radical R is an organic radical which has not only aromatic groups but also aliphatic groups. The araliphatic radical R may have 7 to 18 carbon atoms. A radical R such as an aliphatic radical may, besides carbon and hydrogen, also contain heteroatoms, such as oxygen, nitrogen or sulfur. In addition there may likewise be further functional groups present, such as ester groups or urethane groups. Furthermore, the radical R may likewise contain alkene or alkyne groups. It may likewise be polyunsaturated and/or may likewise contain more than one alkyne group. R is more preferably an aliphatic radical having 2 to 12 carbon atoms or having 2 to 10 carbon atoms, very preferably 2 to 8 carbon atoms, and especially 2 to 6 carbon atoms. To the skilled person it is clear that the radical R is a divalent radical.

The radical R' is preferably a $C_2$ to $C_{10}$ alkylene radical, more preferably a $C_2$ to $C_8$ alkylene radical, and very preferably a $C_3$ to $C_6$ alkylene radical.

The OH-reactive functional group A is preferably an isocyanate group or an epoxide group. More preferably it is an isocyanate group.

Preference is given to using alkoxysilanes of the general structural formula (II.1)

OCN—$R_1$—Si(R')$_x$(OR'')$_{3-x}$ where
$R_1$ is a $C_2$ to $C_{12}$ alkylene radical, a $C_2$ to $C_{12}$ alkenylene radical, or a polyunsaturated $C_4$ to $C_{12}$ alkylene radical,
the radical R' is selected from the group of C1 to C12 alkyl radicals,
R'' is a methyl or ethyl radical, and
x is 0 to 2.

Preferably $R_1$ is a $C_2$ to $C_{12}$ alkylene radical or even a $C_2$ to $C_{10}$ alkylene radical. More preferably it is a $C_2$ to $C_8$ alkylene radical, and very preferably a $C_2$ to $C_6$ alkylene radical or a $C_3$ alkylene radical. Concerning the radical R', reference may be made to the preferred, more preferred, and very preferred features specified above. Furthermore, x is preferably 0 or 1, and very preferably x=0.

Preference is likewise given to using alkoxysilanes of the general structural formula (II.2)

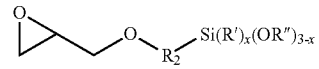

where
$R_2$ is a $C_2$ to $C_{10}$ alkylene radical, a $C_2$ to $C_{10}$ alkenylene radical, or a polyunsaturated $C_4$ to $C_{10}$ alkylene radical,
the radical R' is selected from the group of $C_1$ to $C_{12}$ alkyl radicals,
R'' is a methyl or ethyl radical, and
x is 0 to 2.

Preferably $R_2$ is a $C_2$ to $C_{10}$ alkylene radical or even a $C_2$ to $C_8$ alkylene radical. More preferably it is a $C_2$ to $C_6$ alkylene radical, and very preferably a $C_2$ to $C_4$ alkylene radical or a $C_3$ alkylene radical. Concerning the radical R', reference may be made to the preferred, more preferred, and very preferred features specified above. Furthermore, x is preferably 0 or 1, and very preferably x=0.

Preference is likewise given to using alkoxysilanes of the general structural formula (II.3)

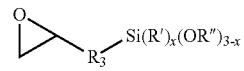

where
R3 is a C2 to C12 alkylene radical, a C2 to C12 alkenylene radical, or a polyunsaturated C4 to C12 alkylene radical,
the radical R' is selected from the group of C1 to C12 alkyl radicals,
R'' is a methyl or ethyl radical, and
x is 0 to 2.

Preferably $R_3$ is a $C_2$ to $C_{12}$ alkylene radical or even a $C_2$ to $C_{10}$ alkylene radical. More preferably it is a $C_2$ to $C_8$ alkylene radical, and very preferably a $C_2$ to $C_6$ alkylene radical or a $C_3$ alkylene radical. Concerning the radical R', reference may be made to the preferred, more preferred, and very preferred features specified above. Furthermore, x is preferably 0 or 1, and very preferably x=0.

Preparation of the Additive of the Invention

The additive of the invention is prepared by, for example, reaction of at least one alpha,omega-hydroxy-functionalized oligoester with at least one alkoxysilane of the structural formula (II). The reaction is carried out in organic solvents. Suitable solvents are all solvents known to the skilled person that do not have an active H atom. Examples of suitable solvents are esters such as butyl acetate or naphtha. The reaction may optionally be carried out in the presence of at least one water scavenger such as triethyl orthoformate, for example. Preference is given to first introducing the alkoxysilane of the structural formula (II) and then adding the alpha,omega-hydroxy-functionalized oligoester dropwise. Where A is an isocyanate group, the amount of remaining isocyanate groups in the reaction solution can be determined by titrimetry, in accordance for example with DIN EN ISO 11909 (date: May 2007). Where A is an epoxide group, the amount of remaining epoxide groups in the reaction solution can be determined by titrimetry, in accordance for example with DIN EN ISO 3001 (date: November 1999).

In one particularly preferred embodiment of the additive of the invention, it is prepared by the reaction of at least one alpha,omega-hydroxy-functionalized oligoester of the structural formula (I) with at least one alkoxysilane of the structural formula (II.1).

Further particularly preferred embodiments of the additive of the invention are identified hereinafter:

a) In one particularly preferred embodiment of the additive of the invention, the alpha,omega-hydroxy-functionalized oligoester of the structural formula (I) possesses a number-average molecular weight of 1200 to 1800 g/mol.
b) In another particularly preferred embodiment of the additive of the invention, the alpha,omega-hydroxy-functionalized oligoester of the structural formula (I) possesses a weight-average molecular weight of 3000 to 6000 g/mol.
c) In a further particularly preferred embodiment of the additive of the invention, the alpha,omega-hydroxy-functionalized oligoester of the structural formula (I) possesses an OH number of 70 to 150 mg KOH/g.
d) In a further particularly preferred embodiment of the additive of the invention, the alpha,omega-hydroxy-functionalized oligoester of the structural formula (I) possesses a theoretical carbon-carbon double bond content of 1.5 to 2 mmol/g.
e) In a further particularly preferred embodiment of the additive of the invention, the radicals $R_1$ in the alpha,omega-hydroxy-functionalized oligoester of the structural formula (I) are selected from the group of linear alkylene radicals having 6 to 10 carbon atoms.
f) In a further particularly preferred embodiment of the additive of the invention, the radicals $R_2$ in the alpha,omega-hydroxy-functionalized oligoester of the structural formula (I) are selected from the group of linear alkylene radicals having 4 to 8 carbon atoms or of linear alkenylene radicals having 2 to 4 carbon atoms.
g) In a further particularly preferred embodiment of the additive of the invention or of the alpha,omega-hydroxy-functionalized oligoester of the structural formula (I), the molar ratio between the linear alkylene radicals and the linear alkenylene radicals is 0.9:1.1 to 1.1:0.9.
h) In a further particularly preferred embodiment of the additive of the invention, the radical $R_1$ in the alkoxysilane of the structural formula (II.1) is a $C_2$ to $C_6$ alkylene radical.
i) In a further particularly preferred embodiment of the additive of the invention, x in the alkoxysilane of the structural formula (II.1) is zero.
j) In a further particularly preferred embodiment of the additive of the invention, at least 99 mol % of all the OH groups of the alpha,omega-hydroxy-functionalized oligoester are reacted with an OH-reactive functional group A of the alkoxysilane of the invention.

In an especially preferred embodiment of the alpha,omega-hydroxy-functionalized oligoester of the invention, all of the features indicated under a) to j) are realized in combination.

Description of the Solventborne Clearcoat Material

It is essential to the invention that the solventborne clearcoat material comprises at least one additive of the invention. The sum of the weight percentage fractions of all additives of the invention here is 0.5 to 10 wt %, based on the total amount of the solventborne clearcoat material. The sum of the weight percentage fractions of all additives of the invention is preferably 1 to 9 wt %, more preferably 1 to 8 wt %, and very preferably 1.5 to 7.5 wt % or even 1.5 to 6.5 wt %, based in each case on the total weight of the clearcoat material. Below the lower limit of 0.5 wt %, there is no improvement in the adhesion. Above the upper limit of 10 wt %, disadvantages occur, such as yellowing of the resultant coating, for example.

In the solventborne clearcoat material of the invention, the sum of the weight percentage fractions of the additives of the invention is 0.5 to 10 wt %, based on the total amount of the solventborne clearcoat material. Where preferred embodiments of the additives of the invention are used, the sum of the weight percentage fractions of all preferred embodiments of the additive is preferably likewise 0.5 to 10 wt %, based on the total amount of the solventborne clearcoat material. With particular preference, the clearcoat material of the invention, as such additives, comprises exclusively preferred embodiments of the additives.

In one preferred embodiment of the solventborne clearcoat material of the invention, the sum of the weight percentage fractions of the additives of the invention is 1 to 9 wt %, based on the total amount of the solventborne clearcoat material. Where preferred embodiments of the additives of the invention are used, the sum of the weight percentage fractions of all preferred embodiments of the additive is preferably likewise 1 to 9 wt %, based on the total amount of the solventborne clearcoat material. With particular preference, the clearcoat material of the invention, as such additives, comprises exclusively preferred embodiments of the additives.

In one very preferred embodiment of the solventborne clearcoat material of the invention, the sum of the weight percentage fractions of the additives of the invention is 1 to 8 wt %, based on the total amount of the solventborne clearcoat material. Where preferred embodiments of the additives of the invention are used, the sum of the weight percentage fractions of all preferred embodiments of the additive is preferably likewise 1 to 8 wt %, based on the total amount of the solventborne clearcoat material. With particular preference, the clearcoat material of the invention, as such additives, comprises exclusively preferred embodiments of the additives.

In one especially preferred embodiment of the solventborne clearcoat material of the invention, the sum of the weight percentage fractions of the additives of the invention is 1.5 to 7.5 wt %, based on the total amount of the solventborne clearcoat material. Where preferred embodiments of the additives of the invention are used, the sum of the weight percentage fractions of all preferred embodiments of the additive is preferably likewise 1.5 to 7.5 wt %, based on the total amount of the solventborne clearcoat material. With particular preference, the clearcoat material of the invention, as such additives, comprises exclusively preferred embodiments of the additives.

In a likewise especially preferred embodiment of the solventborne clearcoat material of the invention, the sum of the weight percentage fractions of the additives of the invention is 1.5 to 6.5 wt %, based on the total amount of the solventborne clearcoat material. Where preferred embodiments of the additives of the invention are used, the sum of the weight percentage fractions of all preferred embodiments of the additive is preferably likewise 1.5 to 6.5 wt %, based on the total amount of the solventborne clearcoat material. With particular preference, the clearcoat material of the invention, as such additives, comprises exclusively preferred embodiments of the additives.

An example that may be given of embodiments of the additive of the invention that are preferred in this sense is one prepared by reacting at least one alpha,omega-hydroxy-functionalized oligoester of the structural formula (I) with at least one alkoxysilane of the structural formula (II.1).

Examples of embodiments of the additive of the invention that are preferred in this sense are those already specified in connection with the description of the additive of the invention.

Use may be made of the solventborne clearcoat materials familiar to the skilled person. The clearcoat material comprises at least one organic polymer as binder. These organic polymers are, for example, the polyester resins and/or polyacrylate and polymethacrylate resins (referred to below as poly(meth)acrylate resins) that are known to the skilled person. The stated organic polymers preferably further comprise different functional groups for chemical crosslinking, with hydroxyl groups being preferred. Further groups preferred for chemical crosslinking include carbamate groups. Preference is given to using polyester resins and/or poly(meth)acrylate resins, which preferably contain hydroxyl groups. Particularly preferred are poly(meth)acrylate resins, which preferably contain hydroxyl groups.

Crosslinkers which may be used include amino resins and polyisocyanates. As amino resins, melamine resins are preferably used.

Polyisocyanates contemplated include aliphatic and cycloaliphatic polyisocyanates. Isocyanates react with hydroxyl groups even at room temperature. It is therefore necessary to supply or produce the clearcoat material, which comprises, for example, a hydroxy-functional polymer, (millbase) and the crosslinker (curing agent) separately, and to mix them with one another not until shortly before application. The clearcoat material is then also referred to as a 2-component clearcoat. Examples of polyisocyanates used are diisocyanates. Preferred diisocyanates are hexamethylene diisocyanate (HMDI), isophorone diisocyanate (IPDI), diphenylmethane diisocyanate (MDI), and tetramethylxylyl diisocyanate (TMXDI). Furthermore, polyisocyanate adducts are likewise used. These are, customarily, oligomers formed from diisocyanates. Diisocyanates suitable for this purpose are preferably those already specified above. The processes for the oligomerization lie in the formation of different adducts: urethanes, allophanates, biurets, uretdiones, and—preferably—isocyanurates. Employed with particular preference on account of their viscosity are isocyanurate trimers of hexamethylene diisocyanate.

In principle it is also possible to use capped polyisocyanates. Capped isocyanates are sometimes also referred to in the literature as blocked polyisocyanates. Capped isocyanates are formed when the free isocyanate groups of polyisocyanates are reacted with H-reactive compounds whose reaction with the isocyanates is reversible at elevated temperature. The capped polyisocyanates do not react with hydroxy-functional polymers at room temperature, and can therefore be readily mixed with them. In such a case, therefore, the term 1-component clearcoats is also used. In principle it is also possible to use all polyisocyanates already specified above. Capping agents that are suitable include, in particular, epsilon-caprolactam, 1,2,4-triazole, methyl ethyl ketoxime, 3,5-dimethyl-1,2-pyrazole, ethyl acetoacetate, or diethyl malonate.

The fraction of all film-forming components, preferably of the hydroxy-functional polyester resin and/or poly(meth)acrylate resin and of the crosslinkers, preferably amine resins and polyisocyanates, is advantageously in the range from 10 to 90 wt %, preferably from 15 to 60 wt %, more preferably in the range from 20 to 50 wt %, based in each case on the total amount of the solventborne clearcoat material. The fraction of a resin, considered separately in each case, and also of a crosslinker is advantageously not less than 3 wt %, based on the total amount of the solventborne clearcoat material.

Customarily it is necessary to catalyze the crosslinking reaction. For this purpose, organotin salts are almost always used. For the purposes of the present invention, preference is given to using dibutyltin dilaurate, since its relatively long-chain acid radical endows it with particularly high compatibility with the binder and then, later on, with the film matrix.

The clearcoat material of the invention further comprises organic solvents. Examples of those present may be aliphatic and/or aromatic hydrocarbons such as toluene, xylene, solvent naphtha, Solvesso 100, Shellsol A, ketones, such as acetone, methyl ethyl ketone, or methyl amyl ketone, esters, such as ethyl acetate, butyl acetate, methoxypropyl acetate, butyl glycol acetate, pentyl acetate, or ethyl ethoxy-propionate, ethers such as butyl glycol, dipropylene glycol methyl ether, alcohols such as ethylhexanol, butoxypropanol, isopropanol, or butyldiglycol, or mixtures of the aforementioned solvents.

Furthermore, the coating material is a solventborne clearcoat material. The term "solventborne" is to be understood below to mean that exclusively organic solvents, and no water, are used as solvent. More particularly, the water content of the solventborne clearcoat material of the invention is to be not greater than 5 wt %, and especially not greater than 2 wt %, based in each case on the total amount of the solventborne clearcoat material of the invention.

The clearcoat material may further comprise at least one conventional coatings additive. Such coatings additives are for example—but not exclusively—
flow control agents,
light stabilizers, and/or
rheology control additives, and/or
catalysts.

Description of the Process of the Invention

The present invention further relates to a process for producing a multicoat paint system on a substrate, comprising
(A) Applying a basecoat material,
(B) Applying a solventborne clearcoat material of the invention,
(C) Jointly curing the basecoat material and the clearcoat material.

All particular features already discussed above with regard to the solventborne clearcoat material of the invention are likewise preferred for the process of the invention in question.

The term "curing" refers to thermal curing. For the purposes of the present invention, the term "thermal curing" denotes the heat-initiated crosslinking of a coating film, with either a separate crosslinking agent or else self-crosslinking binders being employed in the parent coating material. The crosslinking agent comprises reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. The conditions under which the thermal curing may take place are described later on below in the text, for each of the films/coats. Furthermore, it is noted that the term "drying" refers to the giving-up of solvents.

This process is used preferably in automotive OEM finishing. Suitable substrates are therefore metal substrates in particular. Metal substrates are all of those familiar to the skilled person, such as aluminum, iron, zinc, and magnesium, for example, and also alloys thereof. Particularly preferred are substrates of aluminum or steel. Alternatively, nonmetallic substrates may also be used, such as plastics or composite materials.

Preferably, moreover, the substrates may have been given an electrodeposition coating and also a primer surface coat. Electrodeposition coating materials are described in, for example, Römpp-Lexikon Lacke und Druckfarben, Georg Thieme Verlag, Stuttgart, N.Y., 1998, page 189. Primer surfacers are described in, for example, Römpp-Lexikon Lacke und Druckfarben, Georg Thieme Verlag, Stuttgart, N.Y., 1998, pages 249 to 250.

Basecoat Material

The present process is used preferably in automotive OEM finishing. The customary basecoat materials known to the skilled person are used. Not only solventborne but also aqueous basecoat materials may be employed.

The solventborne basecoat materials comprise preferably cellulose acetobutyrate and also polyester resins and/or polyacrylate and polymethacrylate resins (referred to hereinafter as poly(meth)acrylate resins).

The polyester resins and/or poly(meth)acrylate resins preferably further comprise different functional groups for chemical crosslinking, with hydroxyl groups being preferred. Amino resins, preferably melamine resins, are used as crosslinkers.

Solvents which can be used are all those already specified above in connection with the solventborne clearcoat material of the invention. The use of aqueous basecoat materials is preferred. "Aqueous" is a term, familiar to the skilled person, applied specifically to coating materials which as solvents do not exclusively comprise organic solvents, but instead are also based on water as solvent. Aqueous in the context of the present invention means more particularly that the basecoat material contains preferably at least 20 wt %, more preferably at least 25 wt %, of water, based in each case on the total amount of the aqueous basecoat material. Aqueous means more preferably that in addition to the stated conditions "at least 20 wt % (or at least 25 wt %) of water, based on the total amount of the aqueous basecoat material", the further precondition must be met that the fraction of organic solvents in the basecoat material is in the range from 10 to 20 wt %, based in each case on the total amount of the aqueous basecoat material.

Besides water, moreover, the aqueous basecoat material may also comprise organic solvents. Water-miscible organic solvents are used with preference.

Serving as binders in aqueous basecoat materials are preferably polyurethane resins, polyester resins and/or epoxy resins. Likewise possible is the use of poly(meth) acrylate resins. The stated organic polymers preferably further comprise different functional groups for chemical crosslinking, with hydroxyl groups being preferred. Dispersibility of the organic polymers in water can be achieved via measures familiar to the skilled person. These may involve the ionic modification of the organic polymers through introduction of monomers containing, for example, carboxylate groups or sulfonate groups. Amine resins and polyisocyanates are used preferably as crosslinkers. Preferred amine resins are melamine resins. Preferred polyisocyanates are all those already disclosed when describing the solventborne clearcoat material.

In addition, both a solventborne basecoat material and an aqueous basecoat material comprises at least one customary and known, color-imparting and/or effect-imparting pigment. Examples of such pigments are inorganically based pigments, such as titanium dioxide, iron oxide, and carbon black, for example, or else customary metal pigments (examples being commercial aluminum bronzes, stainless steel bronzes) and nonmetallic effect pigments (examples being pearlescent pigments and interference pigments). Color-imparting pigments on an organic basis as well, such as azo pigments and phthalocyanine pigments, may be employed. The selection of pigment type and amount of pigments to be used is made in the manner familiar to the skilled person, and is guided by the required or desired properties of the coating material. For further details on this, refer to Römpp-Lexikon Lacke und Druckfarben, Georg Thieme Verlag, Stuttgart, N.Y., 1998, page 451.

Application of the Basecoat and Clearcoat Materials

The basecoat material is applied by the customary methods of application, such as spraying, knifecoating, brushing, pouring, dipping, impregnating, trickling or rolling, for example. Spray application is preferred, more preferably pneumatic spray application or, in particular, electrostatic spray application (ESTA). The basecoat film may be dried before the clearcoat material of the invention is applied. This drying may take place, for example, at room temperature (18 to 23° C.) for 5 to 90 minutes, preferably 20 to 80 minutes, and very preferably 30 to 70 minutes. Alternatively and with particular preference, however, drying takes place at 70 to 90° C. over a time of 5 to 15 minutes.

Where the coating material is a 2-component clearcoat material, millbase and crosslinker are present separately. The additive of the invention may in that case be present both in the millbase and in the curing component comprising the crosslinker. Shortly before application, these two components are mixed with one another in a ratio familiar to the skilled person, and the resulting clearcoat material is applied.

For applying the clearcoat material of the invention it is possible in principle to use all above-stated application methods which have already been specified in connection with the basecoat material. Spray application is preferred. Application of the solventborne clearcoat material of the invention takes place in the customary and known film thicknesses, as for example in wet film thicknesses of 50 to 250 micrometers, preferably of 60 to 150 micrometers. The resulting dry film thicknesses after curing are then, for example, in the range from 15 to 90 micrometers, preferably in the range from 30 to 70 micrometers.

The basecoat film and the clearcoat film are subsequently cured jointly. Curing has no peculiarities in terms of method, but instead takes place according to the customary and known methods such as heating in a forced air oven, for example. Curing, accordingly, may take place, for example, at temperatures in the range from, for example, 80° C. to 200° C., preferably from 100° C. to 150° C. Curing may take place, for example, over a time of 5 to 120 minutes, preferably 10 to 40 minutes. Curing may optionally be preceded by a flash-off phase or preliminary drying phase, at room temperature (18-23° C.) for a duration of 1 to 60 minutes, for example.

The present invention likewise relates to a multicoat paint system producible by the process of the invention. All particular features discussed with regard to the solventborne clearcoat material of the invention and also to the process of the invention are likewise preferred for the multicoat paint system.

The multicoat paint system obtained in accordance with the process of the invention is more particularly a system obtained in the area of automotive OEM finishing. In this context, defect sites may occur. The defective sites may then be coated again with a corresponding basecoat material and with a clearcoat material. In this way a refinish is obtained. A refinish of this kind may be applied extensively, for example. If there are only small defect sites, referred to as "spots", then only they are repaired, i.e., coated with the corresponding basecoat material and clearcoat material. A process of this kind is then referred to as spot repair.

One preferred embodiment of the process of the invention corresponds to that stated above, in which, atop the clearcoat film as per step (C) in the process of the invention,
i. a basecoat film is applied,
ii. a clearcoat film is applied, and
iii. the basecoat film and the clearcoat film are jointly cured.

The clearcoat film obtained in step (C) is preferably overbaked at least once, preferably precisely twice or even three times or four times, before the steps i. to iii. are performed.

The basecoat and clearcoat materials whose use is preferred in this preferred embodiment are described below.

It is possible, basically, to use the same basecoat materials as already described above and employed in step (A) of the process of the invention. For both solventborne and aqueous basecoat materials, however, it is customary not to use amine resins. In the present case, indeed, the basecoat materials are preferably to crosslink at temperatures below 100° C. The crosslinking temperature of melamine resins, however, is customarily above 100° C. As crosslinkers, therefore, preference is given to using polyisocyanates, but not blocked polyisocyanates. Particularly preferred are all those already stated above. Preferably, therefore, 2-component basecoat materials (2K basecoats) are used.

Basically, the clearcoat material for use at this point comprises the same components as already elucidated above in connection with the clearcoat material of the invention, and used in step (B) of the process of the invention. The clearcoat material for use here, however, does not comprise an additive of the invention, and is different in that sole respect already from the clearcoat material of the invention. As already stated, the intention here is for crosslinking to take place even, preferably, at temperatures below 100° C. Here as well, therefore, amine resins and blocked polyisocyanates are not used. Preference is therefore given to using polyisocyanates which are not blocked as crosslinkers. Particularly preferred are all those already stated above. Preferably, therefore, 2K clearcoats are used.

The basecoat material is applied in accordance with the customary application methods, such as, for example, spraying, knifecoating, brushing, pouring, dipping, impregnating, trickling or rolling, which may also be used in step (B) of the process of the invention. Preference is given to spray application, more preferably a pneumatic spray application or more particularly electrostatic spray application (ESTA). The basecoat material is applied in the customary and known film thicknesses, as for example in wet film thicknesses of 5 to 200 micrometers, preferably of 20 to 100 micrometers. The resulting dry film thicknesses after curing are then, for example, in the range from 2 to 40 micrometers, preferably in the range from 5 to 20 micrometers. The basecoat film may be dried before the clearcoat material is applied. This drying may take place, for example, at room temperature (18 to 23° C.) for 5 to 90 minutes, preferably 20 to 80 minutes, and very preferably 30 to 70 minutes. Alternatively and with particular preference, however, drying takes place at 70 to 90° C. over a time of 5 to 15 minutes. The clearcoat material is subsequently applied. Customarily it is a 2K clearcoat material. In such a case, curing component and millbase are mixed shortly before the clearcoat material is applied. For the application of the clearcoat material of the invention it is possible in principle to use all above-stated application methods already mentioned in connection with the basecoat material. Spray application is preferred. The clearcoat material is applied in the customary and known film thicknesses, as for example in wet film thicknesses of 50 to 250 micrometers, preferably of 60 to 150 micrometers. The resulting dry film thicknesses after curing are then, for example, in the range from 15 to 90 micrometers, preferably in the range from 30 to 70 micrometers. The basecoat film and the clearcoat film are subsequently cured jointly. Curing has no peculiarities in terms of method, but instead takes place according to the customary and known methods such as heating in a forced air oven, for example. Curing, accordingly, may take place, for example, in the region of room temperature or else at elevated temperatures in the range from, for example, 40° C. to 100° C., preferably from 50° C. to 90° C. Curing may take place, for example, over a time of 5 to 120 minutes, preferably 10 to 40 minutes. Curing may optionally also be preceded by a flashing-off or preliminary-drying phase, at room temperature for a period of 1 to 60 minutes, for example.

The coatings obtained exhibit outstanding adhesion between the clearcoat as per step (C) and the basecoat applied thereon.

The present invention likewise relates to a multicoat paint system which is producible according to this preferred embodiment of the process of the invention. All particular features discussed with regard to the solventborne clearcoat of the invention and also to this preferred embodiment of the process of the invention are likewise preferred for the multicoat paint system.

In the fitting-out of automobile bodies, the windows are inserted, with specific sealants, into the intended grooves in the window frames, and adhesively bonded. A further preferred embodiment of the process of the invention, corresponding to that stated above, is one wherein a sealant is applied to the cured clearcoat as per step (C).

All particular features already described above with regard to the solventborne clearcoat material of the invention are likewise preferred for the process of the invention in question.

The sealants to be used consist customarily of plastically deformable beads. They comprise as binders customarily moisture-curing polyurethanes. These are prepolymers of polyether polyols and stoichiometrically excess amounts of aromatic diisocyanates, which then form terminal isocyanate groups. The crosslinking reaction involves the absorption of atmospheric moisture. Carbamic acids are formed in the process, which break down rapidly into primary amine and carbon dioxide. The amine formed then reacts further with the remaining isocyanate groups. Catalysts can be used in order to accelerate this reaction. Preference here is given to dibutyltin dilaurate and bismuth lactate. Typical sealants further comprise pigments. A preferred pigment here is carbon black. It is present preferably at up to 20 wt %, based on the overall mass of the sealant. Corresponding sealants for use are known to the skilled person and are available commercially, as for example under the names Sikaflex® 250PC-T, Sikaflex® 250DB-2, and EFBOND® DA293.

The sealant is applied in accordance with the customary application methods known for this purpose to the skilled person. Spray application is preferred.

The coatings obtained exhibit outstanding adhesion between the clearcoat as per step (C) and the sealant.

The present invention likewise relates to a multicoat paint system which is producible according to this preferred embodiment of the process of the invention. All particular features discussed with regard to the solventborne clearcoat of the invention and also to this preferred embodiment of the process of the invention are likewise preferred for the multicoat paint system.

Use of the Additive of the Invention as Adhesion Promoter

The present invention also relates, lastly, to the use of at least one additive in solventborne clearcoat materials, the additive being preparable by reacting (a) at least one alpha,omega-hydroxy-functionalized oligoester which possesses an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10 000 g/mol, and (b) at least one alkoxysilane of the structural formula (II)

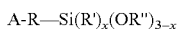

$$A-R-Si(R')_x(OR'')_{3-x}$$

where

A is an OH-reactive functional group,

R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms, the radical R' is selected from the group of C1 to C12 alkyl radicals, R'' is a methyl or ethyl radical, and x is 0 to 2, with the proviso that at least 90 mol % of all the OH groups of the alpha,omega-hydroxy-functionalized oligoester have been reacted with an OH-reactive functional group A, and, in addition, the sum of the weight percentage fractions of all additives of the invention is 0.5 to 10 wt %, based on the total amount of the solventborne clearcoat material.

All particular features already discussed above with regard to the solventborne clearcoat material of the invention are likewise preferred for the inventive use in question.

Improving adhesion means improving the adhesion in comparison to clearcoat materials which contain no additive of the invention.

The additives of the invention are used preferably for improving the adhesion in refinishing. The improvement to the adhesion occurs more particularly between the clearcoat, which may have been overbaked one or more times, and the coat that is applied to said clearcoat in the course of the repair. This latter coat is customarily a basecoat, to which, moreover, a clearcoat has been applied (cf. the process described above in relation to refinishing). In the present case, the term "refinish" refers to the OEM refinishing. This means that defects which have occurred in the course of OEM finishing are remediated or repaired directly in the plant. Any defect sites may be repaired extensively. In addition, however, spot repair is also possible. The adhesion can be investigated with the aid, for example, of the crosscut test according to DIN EN ISO 2409 (date: April 2010).

The additives of the invention are likewise preferably used for improving the adhesion in the context of window bonding. The improvement to the adhesion occurs more particularly between the clearcoat, which is optionally overbaked one or more times, and the sealant that is applied thereto in the course of window bonding. The adhesion can be investigated with the aid, for example, of a "window bonding test" (peel test of glazing adhesives). The target value is ≤2. The peel test for glazing adhesives is carried out in accordance with the method described in WO 2012/058735 A1 on page 23, last paragraph to page 24, line 2, although the failure mode is evaluated in accordance with a modified scheme with ratings of 1 to 4, this scheme being elucidated in I.3 in the Experimental Section. The peel test described in WO 2012/058735 A1 on page 23, last paragraph to page 24, line 2 is carried out under atmospheric conditions in accordance with DIN EN ISO 6270-2 CH (date: September 2005).

An adhesive (EFBOND® DA 293) was applied as sealant to the cured clearcoat. This adhesive is used to bond the clearcoat to a glass sheet.

Likewise preferably, the additive of the invention are used for improving the adhesion of various other components, preferably of adhesive acrylate tapes, on the clearcoat in question. The adhesive acrylate tape is used preferably for the mounting of trim strips or model badges.

EXAMPLES

Preparation Example

Example A

Preparation of the Alpha,Omega-Hydroxy-Functionalized Oligoester

The reactants identified in table 1 are reacted as set out below in the molar proportions indicated therein. First of all, maleic anhydride (MAn), adipic acid (AD), and 1,6-hexanediol (HD) are charged to a 4-liter reactor made from stainless steel and equipped with a column, a condenser, and a water separator. This is followed by addition of 3% of xylene as azeotrope former and of 0.1% of methylhydroquinone (the percentage figures are based on the amount of the MAn, AD, and HD used). The resulting reaction mixture is heated under lean air over the course of 5 minutes. Throughout the reaction time, the temperature of the reaction mixture does not exceed 230° C. When an acid number of 2 mg KOH/g is reached, the reaction mixture is cooled to 80° C. The characteristic data for the resulting alpha,omega-hydroxy-functionalized oligoesters are as follows:

OH number: 65 mg KOH/g

Number-average molecular weight: 1412 g/mol

Weight-average molecular weight: 3313 g/mol

Theoretical carbon-carbon double bond content: 1.86 mmol/g

TABLE 1

Amounts of substance of the reactants for use, in mol.

|   | Raw material | Amount of substance |
|---|---|---|
| 1 | MAn | 5.05 |
| 2 | AD | 5.53 |
| 3 | HD | 14.46 |
| Solids content [%] | | 97 |

Example B

Preparation of an Inventive Additive (A1)

A steel reactor equipped with a reflux condenser and a thermometer is charged with 27.4 parts of 3-isocyanatopropyltriethoxysilane from ABCR GmbH & Co. KG (European dispatch of Gelest INC. products), 9.4 parts of butyl acetate, 0.2 part of 1,4-diaza-bicyclo[2.2.2]octane, and 2.2 parts of triethyl orthoformate. Via a dropping funnel, subsequently, a mixture of 46.3 parts of the alpha,omega-hydroxy-functionalized oligoester (example A) and 14.5 parts of butyl acetate is added dropwise under a nitrogen atmosphere and with stirring. After 6-hour stirring at 70-80° C., the NCO value is verified by titrimetry according to DIN EN ISO 11909 (date: May 2007) and the reaction is continued until an NCO value of 0 is found. The inventive additive A1 has a nonvolatiles content of 71.8 wt %.

I) Window Bonding Adhesion

I.1) Preparation of a Solventborne 2K Clearcoat Material Comprising Additive (A1)

A commercial solventborne 2-component clearcoat material was used. The composition of the two millbase and curing agent components is shown in table 2. Both the millbase and the curing agent were each admixed with 4 wt % of the additive (A1), based on the total amount of the 2-component clearcoat material. A laboratory stirrer was used for the additization (260-1820 rpm). The millbase and curing agent components are used in a ratio of 100:36, the ratio being based on the weight of the components.

TABLE 2

Composition of the clearcoat material used (millbase, curing agent). The weight percentage figures are based in each case on the total weight of the millbase or of the curing agent, respectively.

| Millbase | | Curing agent | |
| --- | --- | --- | --- |
| Component | wt % | Component | wt % |
| Hydroxy-functional acrylate (I) | 35 | Butyl acetate | 3.2 |
| Hydroxy-functional acrylate (II) | 26 | Isophorone diisocyanate | 15.2 |
| Antisettling agent | 13 | Desmodur N3390 | 78.2 |
| Thixotropic agent | 2 | Solvent naphtha | 3.4 |
| Cymel 202 (82% form), (melamine-formaldehyde resin) | 8 | | |
| Solvent naphtha | 4 | | |
| Tinuvin 384 (light stabilizer) | 1.1 | | |
| Tinuvin 292 (light stabilizer) | 0.9 | | |
| Butyl acetate | 3.7 | | |
| Byk 325 (surface additive) | 0.2 | | |
| Dipropylene glycol methyl ether | 7 | | |
| Butanol | 1 | | |

I.2) Production of a Coated Substrate

The clearcoat material is applied to a substrate coated successively with an electrocoat material, a primer surfacer, and a basecoat material. The electrocoat is produced using the commercially available product CathoGuard® 500 from BASF Coatings. The primer surface coat is produced using the commercially available product SecuBloc® from BASF Coatings. The substrate coated with the primer surfacer is coated with the basecoat material so as to give a dry basecoat film thickness of 10-15 micrometers. The basecoat is produced using a commercially available aqueous basecoat material, this being the commercially available product Colorbrite® from BASF Coatings. This is followed by drying at 80° C. for 7 minutes. To produce the clearcoat material, millbase and curing agent as per table 2, and also the additive (A1) present in the millbase component, are stirred together homogeneously using a wooden spatula, the millbase and curing agent components being used in a ratio of 100:36, the ratio being based on the weight of the components, and the mixture is subsequently applied pneumatically. At this point the clearcoat is dried to start with at 135° C. for 20 minutes, and the applied coatings are subsequently baked at 135° C. for 30 minutes. The baking step is repeated twice more. The resulting clearcoat has a dry film thickness of 40-45 micrometers.

I.3) Investigation of the Adhesion Properties

An adhesive (EFBOND® DA 293) was applied as sealant to the cured clearcoat. This adhesive is used to bond the clearcoat to a glass sheet. The adhesion properties of the layer of adhesive on the clearcoat are investigated by means of the "window bonding test" (peel test of glazing adhesives) in accordance with the method described above.

The failure mode is evaluated according to the scheme below, with the abbreviation OK standing for "satisfactory", and the abbreviation nOK standing for "unsatisfactory":

| Rating | Evaluation | Cohesive component of fracture |
| --- | --- | --- |
| 1 | OK | >95% |
| 2 | OK | >75% to 95% |
| 3 | nOK | >25% to 75% |
| 4 | nOK | <25% |

It follows from the results set out in table 3 that using the additive allows a significant improvement to be obtained in the adhesion between the layer of adhesive and the clearcoat.

TABLE 3

Adhesion properties of the unadditized and the additized clearcoat materials.

| Formulation | Adhesion (rating) |
| --- | --- |
| no additive | 4 |
| 4 wt % of additive in millbase | 1 |
| 4 wt % of additive in curing agent | 1 |

II) Refinishing of an OEM Finish

II.1) Preparation of a Solventborne 2-Component Clearcoat Material Comprising Additive (A1)

A commercial solventborne 2-component clearcoat material is used. The composition of the two millbase and curing agent components used in preparing the clearcoat material has already been shown in table 2. The millbase was admixed with 4 wt % or with 2 wt % of the additive (A1), based on the total amount of the 2-component clearcoat material. A laboratory stirrer was used for the additization (260-1820 rpm).

II.2) Production of a Coated Substrate

The clearcoat material is applied to a substrate coated successively with an electrocoat material, a primer surfacer, and a basecoat material. This multiple coating takes place in accordance with the procedure described in section I.2). To produce the clearcoat material, millbase and curing agent as per table 2, and also the additive (A1) present in the millbase component, are stirred together homogeneously using a wooden spatula, the millbase and curing agent components being used in a ratio of 100:36, the ratio being based on the weight of the components, and the mixture is subsequently applied pneumatically. At this point the clearcoat is dried to start with at 135° C. for 20 minutes, and the applied coatings are subsequently baked at 135° C. for 30 minutes. The baking step is repeated twice more. The resulting clearcoat has a dry film thickness of 40-45 micrometers. Applied pneumatically atop the overbaked additized clearcoat is a refinish basecoat, in such a way that the refinish basecoat dry film thickness is 10-15 micrometers. The resulting coat is dried at 18-23° C. for 10 minutes. The refinish basecoat material used is the basecoat composition according to table 4. A refinish clearcoat material is subsequently applied by pneumatic spray application. The resulting basecoat-clearcoat system is first dried at room temperature for 10 minutes and then cured in a forced air oven at 60° C. for 10 minutes. The refinish clearcoat material used is the 2-component clearcoat composition according to table 2, with the difference that it contains no additive (A1).

TABLE 4

Basecoat composition used for preparing the refinish basecoat material

| Component | wt % |
|---|---|
| Commercial thixotropic agent (Laponite RD) | 18.2 |
| Water | 9.3 |
| Commercial dispersion of an OH— functional polyurethane resin (water content: 66.0 wt %, organic solvents: 6.3 wt %) | 31.2 |
| Commercial dispersion of an OH— functional polyester resin (water content: 17.7 wt %, organic solvents: 20.0 wt %) | 3.0 |
| Butoxypropanol | 2.0 |
| Cymel 327 (commercial melamine-formaldehyde resin) | 4.2 |
| TMDD BG 52 (commercial wetting agent) | 0.5 |
| DMEA, 10% strength in water | 1.5 |
| Commercial dispersion of an OH— functional acrylate resin (water content: 49.5 wt %, organic solvents: 13.0 wt %) | 5.1 |
| Foamstar MF324 (commercial defoamer) | 0.5 |
| Ethylhexanol | 4.0 |
| BYK 347 (commercial wetting agent) | 0.5 |
| Pluriol P900 (commercial polyethylene glycol) | 2.0 |
| Isopropanol | 2.2 |
| Viscalex HV 30 (commercial rheological agent) | 0.4 |
| ABC tinting paste (10% dispersion of "Monarch 1400" carbon black pigment in water | 10.1 |
| ABC tinting paste (50% dispersion of "Titanrutil 2310" pigment in water | 0.04 |

II.3) Investigation of the Adhesion Properties

The adhesion properties of the coatings produced are investigated by means of the cross-cut test in accordance with DIN EN ISO 2409 (date: April 2010). The adhesion was investigated for a coating system overbaked three times and five times (see table 5).

TABLE 5

Adhesion properties of the unadditized and additized clearcoats of a correspondingly coated substrate in refinishing

| clearcoat material used | Cross-cut test to DIN EN ISO 2409 (3 times overbaked)/rating | Cross-cut test to DIN EN ISO 2409 (5 times overbaked)/rating | Gloss measurement according to DIN EN ISO 2813 |
|---|---|---|---|
| no additive (A1) | 5 | 5 | – |
| 2 wt % of additive (A1), based on the total amount of the 2-component clearcoat | 1 | 1 | + |
| 4 wt % of additive (A1), based on the total amount of the 2-component clearcoat | 1 | 1 | + |

The determination of gloss is used to ascertain the surface gloss of painted areas, and is carried out from an angle of 60° in accordance with DIN EN ISO 2813 (date: October 2012). The assessment is made by determining the gloss value (GU) between 0 and 100. A gloss of less than 35 GU is given as "–", and a gloss >50 is given as "+".

The invention claimed is:

1. A solventborne clearcoat material, comprising at least one additive prepared by reacting
   (a) at least one alpha,omega-hydroxy-functionalized oligoester which possesses an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10000 g/mol, and
   (b) at least one alkoxysilane of the structural formula (II)

$$A-R-Si(R')_x(OR'')_{3-x}$$

wherein
   A is an OH-reactive functional group,
   R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms,
   the radical R' is selected from the group of C1 to C12 alkyl radical,
   R" is a methyl or ethyl radical, and
   x is 0 to 2,
   with the proviso that at least 90 mol % of all the OH groups of the alpha,omega-hydroxy-functionalized oligoester have been reacted with the OH-reactive functional group A, and, in addition,
   the amount by weight of the at least one additive is 0.5 to 10 wt %, based on the total amount of the solventborne clearcoat material.

2. The solventborne clearcoat material of claim 1, wherein the amount by weight of the at least one additive is 1.5 to 7.5 wt %, based on the total amount of the solventborne clearcoat material.

3. The solventborne clearcoat material of claim 1, wherein the alpha,omega-hydroxy-functionalized oligoester possesses the following structural formula (I):

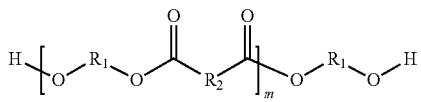

where
- the radicals R1 independently of one another are selected from the group consisting of a linear alkylene radical and a cyclic alkylene radical,
- the radicals R2 independently of one another are selected from the group consisting of an alkylene radical and an alkenylene radical, the ratio of alkylene to alkenylene radicals being selected specifically such that the alpha,omega-hydroxy-functionalized oligoester of the structural formula (I) possesses a theoretical carbon-carbon double bond content of 1 to 2.5 mmol/g, and
- the index m is selected such that the number-average molecular weight of the alpha,omega-hydroxy-functionalized oligoester of the structural formula (I) is 1000 to 3000 g/mol.

4. The solventborne clearcoat material of claim 3, wherein the radicals $R_1$ are linear alkylene radicals having 6 to 10 carbon atoms.

5. The solventborne clearcoat material of claim 3, wherein the radicals $R_2$ are linear alkylene radicals having 4 to 8 carbon atoms or linear alkenylene radicals having 2 to 4 carbon atoms.

6. The solventborne clearcoat material of claim 3, wherein the alkoxysilane possesses the general structural formula (II.1)

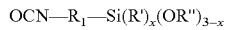

wherein
- R1 is a C2 to C12 alkylene radical, a C2 to C12 alkenylene radical, or a a C4 to C12 polyalkenylene radical,
- the radical R' is a C1 to C12 alkyl radical,
- R" is a methyl or ethyl radical, and
- x is 0 to 2.

7. The solventborne clearcoat material of claim 6, wherein $R_1$ is a $C_2$ to $C_6$ alkylene radical.

8. The solventborne clearcoat material of claim 7, wherein x=0.

9. A process for producing a multicoat paint system on a substrate, the process comprising
(A) applying a basecoat material,
(B) applying the solventborne clearcoat material of claim 1, and
(C) jointly curing the basecoat material and the clearcoat material.

10. A multicoat paint system produced by the process of claim 9.

11. The process of claim 9, wherein, atop the clearcoat film as per step (C),
i. a basecoat film is applied,
ii. a clearcoat film is applied, and
iii. the basecoat film and the clearcoat film are jointly cured.

12. A multicoat paint system produced by the process of claim 11.

13. The process of claim 9, wherein, atop the cured clearcoat film as per step (C), a sealant is applied.

14. A multicoat paint system produced by the process of claim 13.

15. A process for improving the adhesion properties of a clearcoat, the process comprising formulating a solventborne clearcoat material with at least one additive prepared by reacting
(a) at least one alpha,omega-hydroxy-functionalized oligoester which possesses an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10000 g/mol, and
(b) at least one alkoxysilane of the structural formula (II)

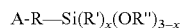

wherein
- A is an OH-reactive functional group,
- R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms,
- the radical R' is a C1 to C12 alkyl radical,
- R" is a methyl or ethyl radical, and
- x is 0 to 2,
with the proviso that at least 90 mol % of all the OH groups of the alpha,omega-hydroxy-functionalized oligoester have been reacted with the OH-reactive functional group A, and, in addition,
the amount by weight of the at least one additive is 0.5 to 10 wt %, based on the total amount of the solventborne clearcoat material.

* * * * *

UNITED STATES PATENT AND TRADEMARK OFFICE
CERTIFICATE OF CORRECTION

PATENT NO. : 10,344,179 B2
APPLICATION NO. : 15/104615
DATED : July 9, 2019
INVENTOR(S) : Audree Andersen et al.

Page 1 of 1

It is certified that error appears in the above-identified patent and that said Letters Patent is hereby corrected as shown below:

On the Title Page

In Column 2, item (57), Abstract, Line 8, "10 000 g/mol," should read --10000 g/mol, --

In the Specification

In Column 1, Line 55 (approx.), "10 000 g/mol," should read -- 10000 g/mol, --

In Column 6, Line 56, "$R^1$" should read -- $R_1$ --

In Column 17, Line 22, "10 000 g/mol," should read -- 10000 g/mol, --

In the Claims

In Column 22, Line 51 (approx.), Claim 1, "radical," should read -- radicals, --

In Column 23, Line 38, Claim 6, "or a a" should read -- or a --

In Column 23, Line 40 (approx.), Claim 6, "radical," should read -- radicals, --

In Column 24, Line 38 (approx.), Claim 15, "radical," should read -- radicals, --

Signed and Sealed this
Fourteenth Day of April, 2020

Andrei Iancu
*Director of the United States Patent and Trademark Office*